United States Patent [19]

Gavrilis

[11] Patent Number: 5,012,222

[45] Date of Patent: Apr. 30, 1991

[54] PROXIMITY WARNING DEVICE FOR PROTECTION OF A PARKED VEHICLE

[76] Inventor: Steve Gavrilis, 1720 65th St., Brooklyn, N.Y. 11204

[21] Appl. No.: 506,417

[22] Filed: Apr. 6, 1990

[51] Int. Cl.$^5$ .............................................. B60Q 5/00
[52] U.S. Cl. .................................. 340/436; 200/61.42; 200/61.47
[58] Field of Search ...................... 340/436, 437, 932.2; 200/61.44, 61.52, 61.47

[56] References Cited

U.S. PATENT DOCUMENTS

| | | |
|---|---|---|
| 2,957,059 | 10/1960 | Meredith . |
| 2,971,067 | 2/1961 | Ticknor ........................ 200/61.47 X |
| 3,012,225 | 12/1961 | Holt et al. . |
| 3,307,187 | 5/1962 | Blakistone ............................ 340/436 |
| 3,409,874 | 11/1968 | Bowler et al. . |
| 3,510,837 | 5/1970 | Lepore et al. . |
| 3,774,149 | 11/1973 | Bennett . |
| 3,895,197 | 7/1975 | Mizrahi ............................ 200/61.47 |
| 3,946,360 | 3/1976 | Serritella ........................... 340/436 |
| 4,070,645 | 1/1978 | Oreluk ............................... 340/436 |
| 4,103,284 | 7/1978 | Blake ................................. 340/436 |
| 4,278,962 | 7/1981 | Lin . |
| 4,855,736 | 8/1989 | Hsu . |

FOREIGN PATENT DOCUMENTS 329149 9/1935 Italy .................................. 200/61.47

Primary Examiner—Joseph A. Orsino
Assistant Examiner—Brian R. Tumm
Attorney, Agent, or Firm—Jordan and Hamburg

[57] ABSTRACT

A sensor assembly for a proximity warning device for protection of a curbside parked vehicle, particularly from potential impact damage from another vehicle parking in an immediately adjacent curbside space, is pivotally mounted in a housing adapted to be mounted on a bumper of a vehicle and includes a relatively heavy body having a lighter elongated feeler element affixed to it and projecting upwardly substantially above the housing. The pivotal mounting permits the sensor assembly to oscillate toward and away from the vehicle. The location of the pivotal axis is so selected that, when the housing is affixed to a bumper of a parked vehicle and the sensor assembly is influenced only by gravity, the sensor assembly assumes a neutral orientation in which the feeler element is substantially vertical regardless of whether the surface on which the vehicle is parked is horizontal or inclined in the lengthwise direction of the vehicle. A liquid metal electrical switch in the sensor assembly is responsive to the orientation of the assembly so that the switch is open when the assembly is in its neutral orientation and is closed when the sensor element has been pushed toward the vehicle on which the device is mounted.

2 Claims, 3 Drawing Sheets

PROXIMITY WARNING DEVICE FOR PROTECTION OF A PARKED VEHICLE

BACKGROUND OF THE INVENTION

This invention relates to a new and improved proximity warning device for protection of a parked vehicle.

A proximity warning device for protection of a parked vehicle is generally a device mounted on the vehicle to sense imminent contact of the parked vehicle with another body, typically another vehicle in the process of parking curbside in front of or behind the parked vehicle, and to actuate a warning signal to alert the driver of the parking vehicle to the imminent contact. A number of warning devices for vehicles for this and other purposes are known. Reference may be had, for example, to U.S. Pat. Nos. 2,957,059; 3,012,225; 3,037,187; 3,409,874; 3,510,837; 3,774,149; 3,946,360; 4,070,645; 4,103,284; 4,278,962; and 4,855,736. Of these, U.S. Pat. Nos. 4,070,645 (Oreluk) and 3,037,187 (Blakistone) may be of especial interest though, when considered with appropriate particularity, they are quite different from the present invention.

Oreluk discloses a warning system including a wand or rod and a mechanism for pivotably coupling the wand to a support arm extending from an automobile. The coupling mechanism includes a circuit for actuating a switch, coupled to the horn of the vehicle, so that the horn sounds whenever the wand is contacted and moved by another vehicle. A spring defines the normally quiescent state of the warning system. Blakistone discloses a similar warning system including a wand and a switch actuating member; a spring normally maintains the wand in its quiescent state.

It is an object of the invention to provide a new and improved proximity warning device for protection of a parked vehicle. Specific objects and advantages of the invention will be apparent from the following descriptions.

SUMMARY OF THE INVENTION

The proximity warning device for protection of a parked vehicle according to the present invention comprises a sensor assembly which includes a relatively heavy body having a lighter elongated feeler element affixed to and projecting from it. The sensor assembly is pivotally supported in a housing which is affixable to a vehicle bumper. The pivotal supporting of the sensor assembly is arranged to permit pivotal oscillation of the sensor assembly about a horizontal pivotal axis which is substantially perpendicular to the lengthwise dimension of the vehicle. The location of the pivotal axis is so selected that, when the housing is affixed to a bumper of a parked vehicle and the sensor assembly is under the influence only of gravity, the sensor assembly assumes a neutral orientation in which the feeler element is substantially vertical in the direction of its elongation regardless of whether the surface on which the vehicle is parked is horizontal or inclined in the lengthwise direction of the vehicle. The housing has an upper opening through which the feeler element upwardly projects with a substantial portion of the feeler element being above the housing and which permits the feeler element to oscillate in either direction from its neutral, substantially vertical orientation.

Further according to the present invention, the sensor assembly includes a liquid metal electrical switch integral with the rest of the sensor assembly. The liquid metal switch comprises a channel which is downwardly inclined away from the vehicle in the direction of the lengthwise dimension of the vehicle when the sensor assembly is in its neutral orientation, a pair of electrical contacts received in the channel at respective locations spaced from each other in the lengthwise dimension of the channel, a quantity of liquid metal received in the channel sufficient to contact only on of the electrical contacts when the sensor assembly is in its neutral orientation and sufficient to contact both of the electrical contacts when the sensor element is pushed toward the vehicle by external means, typically another vehicle, sufficiently to substantially decrease the inclination of the channel. A respective electrically conductive wire is electrically connected to each of the contacts. When the proximity warning device is installed on a vehicle, the electrically conductive wires together with the liquid metal switch are part of an electrical circuit including alarm means responsive to closing of the liquid metal switch.

The invention will now be further described by reference to a specific, preferred embodiment, as illustrated in the drawings.

DETAILED DESCRIPTION OF A PREFERRED EMBODIMENT OF THE INVENTION

Figures 1, 2:
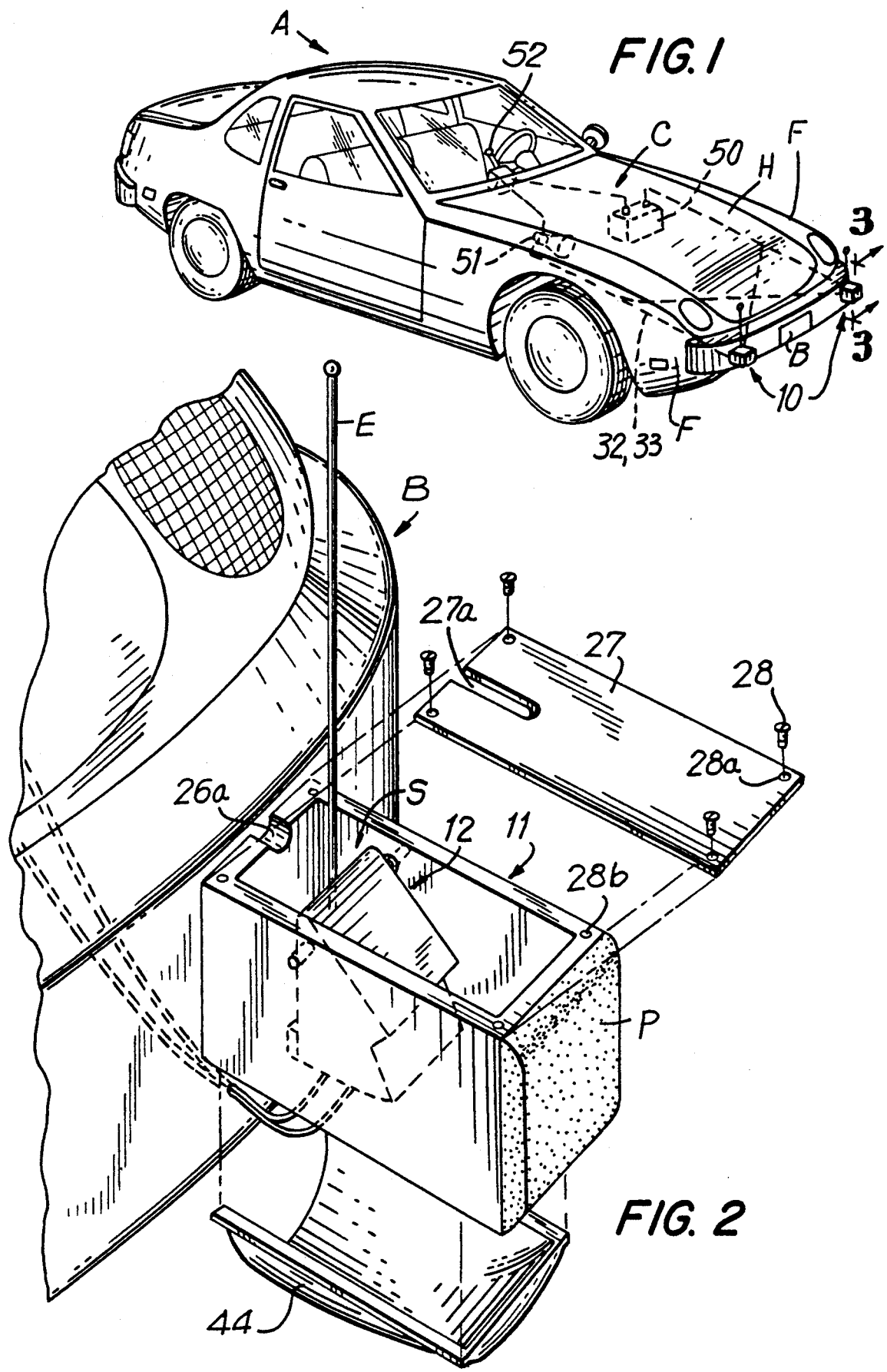
FIG. 1 is a perspective view of an automobile having a pair of proximity warning devices of the present invention symmetrically mounted on the front bumper thereof.
FIG. 2 is a detail of part of FIG. 1 including an exploded view of the housing of one of the devices.

An automobile A (FIG. 1) has mounted on the front bumper B thereof symmetrically a pair of proximity warning devices 10 according to the invention. The illustrated automobile A is a sportscar having a low and pronouncedly downwardly inclined hood H and front fenders F and the devices 10 are mounted on the front bumper B because the infliction to the front end of the bodies of such automobiles, when curbside parked, of damage by a larger vehicle whose rear bumper overrides the front bumper B when the driver of the larger vehicle is in the process of curbside parking ("parallel parking") by backing into a parking space immediately in front of the automobile A is particularly likely. In addition to providing warning, each of the devices 10 of the invention serves as a bumper guard as the housings 11 thereof are of heavy metal construction, project outwardly from the bumper B and on the front wall thereof are provided with a heavy duty rubber or resilient plastic pad P (FIG. 2).

Pivotally supported in the housing 11 is a sensor assembly S. The sensor assembly S includes a relatively heavy body 12 and an elongated substantially straight antenna-like feeler element E which is substantially of lighter weight than the body 12 and which has a substantially widened and flattened lower extremity portion 20 having a hole therethrough aligned with an internally threaded bore in the body 12 by means of which a screw 21 fastens the element E to the body 12. The pivotal supporting of the assembly S is by means of a pivot pin 13 tightly, non-rotatably received in a bore through the body 12 and journalled in respective bores 15 in opposed side walls 16 of the housing 11. The pivot pin 13 is provided with a pair of heads 17 and flanges 18 to keep the body 12 substantially centered in the housing 11 and spaced from the side walls 16.

Figure 3:
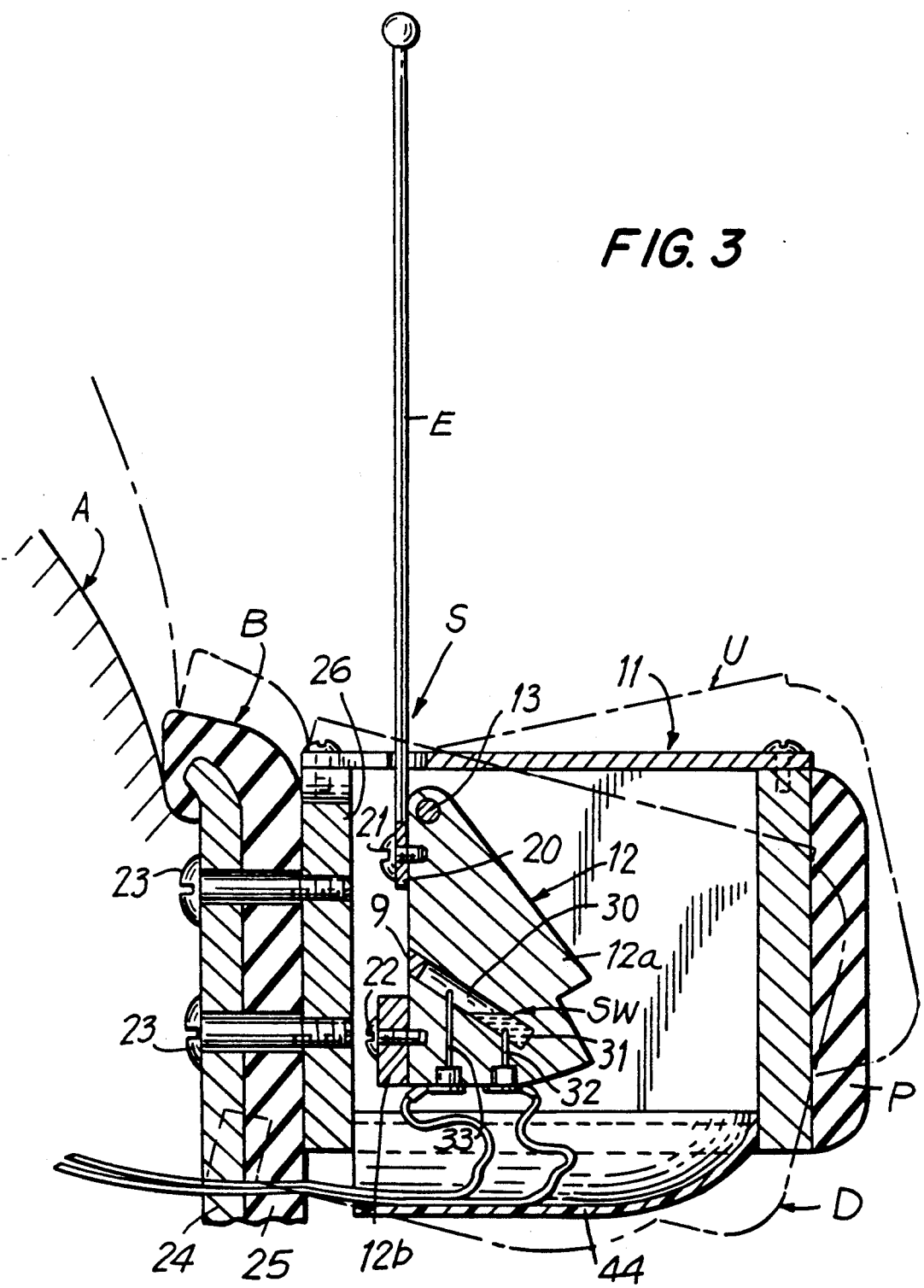
FIG. 3 is a cross section of one of the devices taken on section line 3—3 of FIG. 1.

It is thus seen that the pivotal supporting of the sensor assembly S is arranged to permit pivotal oscillation of the sensor assembly S about a horizontal pivotal axis which is substantially perpendicular to the lengthwise dimension of the automobile A. Moreover, as shown in FIGS. 1 to 3, the location of the pivotal axis is so selected that, when the housing is affixed to the bumper B of a parked vehicle A and the sensor assembly S is under the influence only of gravity, the sensor assembly S assumes a neutral orientation in which the feeler element E is substantially vertical regardless of whether the surface on which the vehicle is parked is horizontal so that the housing 11 is horizontal (solid line position in FIG. 3) or inclined upwardly or downwardly in the forward lengthwise direction of the vehicle so that the housing 11 is likewise inclined upwardly or downwardly (phantom positions U and D, respectively, in FIG. 3). In the illustrated embodiment, the body 12 includes a main body 12a and an auxiliary body 12b fastened to the main body 12a by means of a pair of screws 22 in the same manner that the screw 21 fastens the element E to the main body 12a. The auxiliary body 12b may be made of a material substantially denser than the material of the main body 12a (for example, 12a may be made of a plastic and 12b of steel or 12a may be made of steel and 12b of lead) so that auxiliary body 12b, though smaller than main body 12a, will assure that the neutral orientation of the element E is substantially vertical.

The housing 11 is fastened to the bumper B by means of a pair of screws 23 which pass through holes bored through the metal 24 and rubber or resilient plastic 25 layers of the bumper B and are screwed into internally threaded holes in the rear wall 26 of the housing 11. The housing 11 is provided with a cover 27 which is fastened down by means of four screws 28 through holes 28a at its corners and which are received in corresponding internally threaded holes in the walls of the housing 11. To permit the element E to project above the housing 11 and oscillate toward and away from the automobile A, the cover 27 is provided with a slot through which the element E passes and which is elongated to form a path for the oscillation of the element E and the rear wall 26 of the housing 11 is provided at its upper edge with a notch 26a aligned with the slot 27a to extend the path of oscillation of the element E toward the automobile A.

Figure 4:
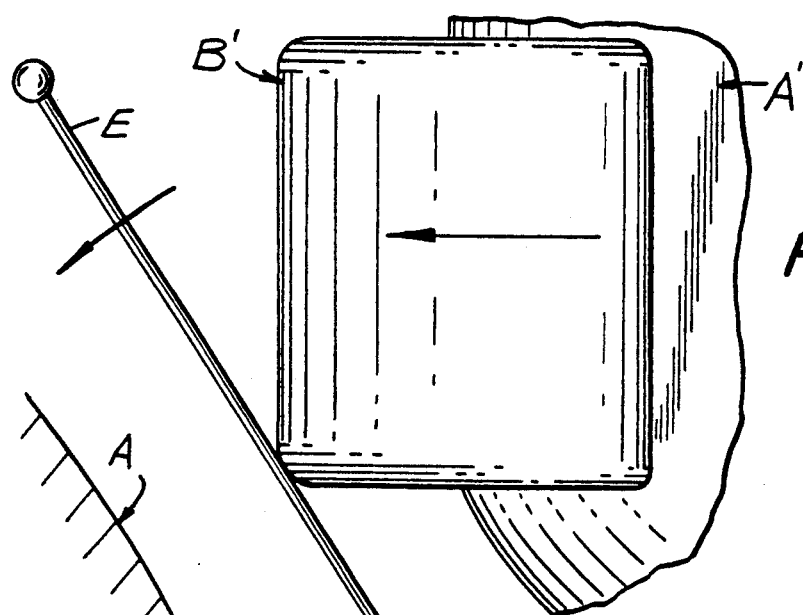
FIG. 4 is a sectional view like that of FIG. 3 but in conjunction with a partial side view of another vehicle showing the rear bumper thereof urging the sensor assembly of the invention into a pivotally moved position.
Figure 5:
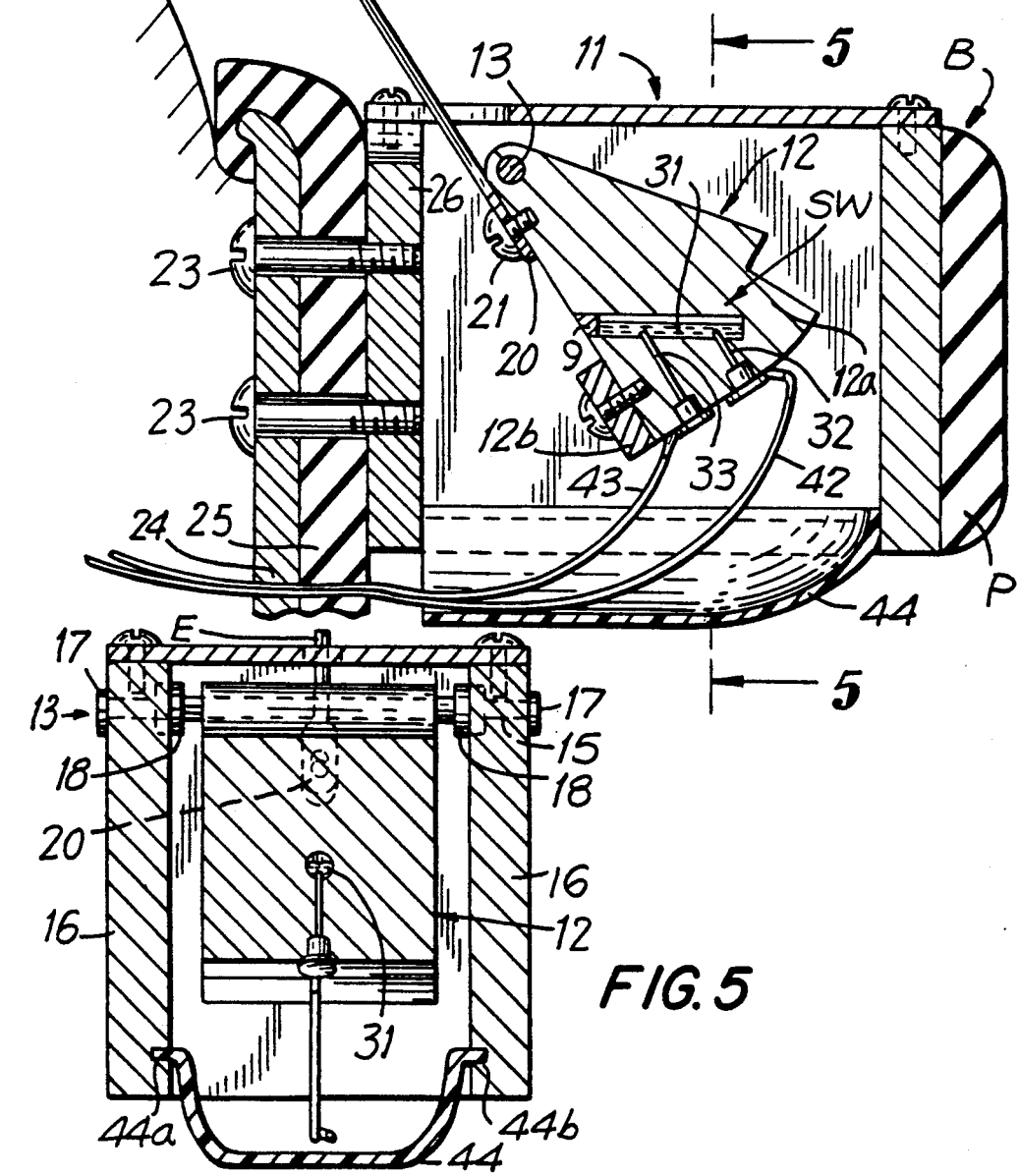
FIG. 5 is a cross section taken on section line 5—5 of FIG. 4.

A liquid metal electrical switch SW is formed in the body 12a. The switch SW consists of a cylindrical bore or channel in the body 12a the open end of which has been sealed by means of a plug 9, a pool 31 of electrically conductive liquid metal, typically mercury, and a pair of electrical contacts 32, 33. When the sensor assembly S is in its neutral orientation (FIG. 3), the channel 30 is inclined downwardly away from the automobile A. The electrical contact 32 is received in the channel 30 at a location along the length of the channel 30 spaced down the inclination of the channel 30 from the electrical contact 33. The quantity of liquid metal 31 received in the channel 30 is sufficient to contact only the lower electrical contact 32 when the sensor assembly S is in its neutral orientation (FIG. 3), thereby effecting an off condition of the switch SW, but is sufficient to contact both electrical contacts 32, 33 simultaneously, thereby effecting an on condition of the switch SW, when the sensor element E is pushed toward the body of the automobile A by the rear bumper B' of the motor vehicle A' which overrides the front bumper B of the automobile A as the vehicle A' backs up thereby to rotate the sensor assembly S counterclockwise so that the channel 30 is reoriented to a less inclined or substantially horizontal orientation (FIG. 4).

Respective insulated electrically conductive wires 42, 43 are electrically connected to the contacts 32 and 33. The contacts 32, 33 and wires 42, 43 are protected from splashing, rain, snow and so forth by the resilient plastic bottom member 44 of the housing 11 which has lateral flanges 44a, 44b which snap into corresponding slots in the side walls 16. The wires 42, 43 pass through a hole bored through the bumper B and therefrom are lead under the hood H to complete an electrical circuit C including both warning devices 10, the automobile battery 50, the conventional automobile warning horn 51 or an additional horn or siren or the like, and a manual switch 52 mounted on the dashboard of the automobile A. The switch 52, which is illustrated greatly enlarged relative to the automobile A for clarity, is for the purpose of permitting the driver to open the circuit and thereby deactivate the system when he enters the vehicle to drive it off, as the sensitivity of the system is such that normal road vibration and the forces of deceleration when stopping or slowing the vehicle would otherwise frequently intermittently trigger an unnecessary and annoying audible warning. Only when leaving the automobile parked does the driver move the switch 52 to its on, i.e., circuit closing position.

Figure 6:
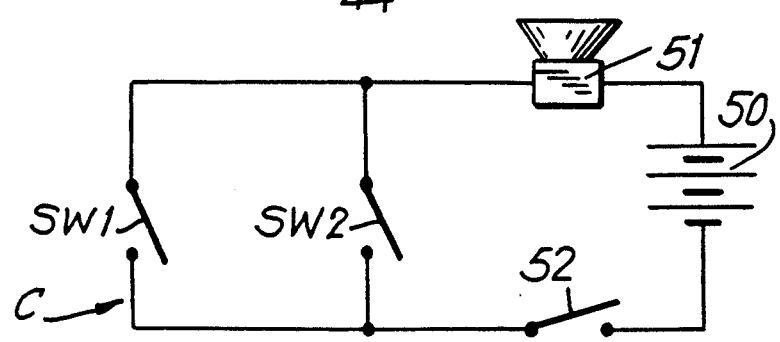
FIG. 6 is a circuit diagram of a system incorporating a pair of devices according to the invention.

FIG. 1 illustrates the circuit C only generally, whereas FIG. 6 is a circuit diagram. Particularly in FIG. 6 it is seen that the switches SW of the respective devices 10, here designated SW1 and SW2 to distinguish them, are connected in parallel to the battery 50, the horn or siren 51 and the switch 52. Thus, when either or both of the switches SW1 or SW2 is "on" or closed, due to such action as illustrated in FIG. 4, and the switch 52 has been manually closed by the driver before leaving the parked automobile A, the horn or siren 51 sounds to alert the driver of the vehicle A' and the sounding of the horn or siren 51 ceases when the driver of the vehicle A' has moved the vehicle A' sufficiently forward of the position illustrated in FIG. 4 so that the respective sensor assemblies S return, under the influence of gravity, to the neutral orientation of FIG. 3 or an orientation sufficiently approximating the neutral orientation that the switches SW1 and SW2 are opened.

While the invention has been particularly described by reference to a preferred embodiment, it is not intended that the claims be construed as being limited thereto. As many modifications and variations equivalent to the particular structure illustrated will be apparent to the ordinary worker in the art, it is intended that the claims be construed to cover such equivalents. Merely for example: an electrically conductive liquid other than metal may be used in the liquid switch SW;

electrical circuitry may be provided in which the system is in a non-warning state when the switch SW is in the on condition and in a warning state when the switch SW is in the off condition.

What I claim is:

1. A proximity warning device for protection of a parked vehicle comprising a sensor assembly, the sensor assembly comprising a relatively heavy body having a lighter elongated feeler element affixed to and projecting from the body, a housing for the sensor assembly, means for affixing the housing to a vehicle bumper, pivot means for pivotally supporting the sensor assembly in the housing for pivotal oscillation about a horizontal pivotal axis which is substantially perpendicular to the lengthwise dimension of the vehicle, the location of the pivotal axis being so selected that, when the housing is affixed to a bumper of a parked vehicle and the sensor assembly influenced only by gravity, the sensor assembly assumes a neutral orientation in which the feeler element is substantially vertical in the direction of its elongation regardless of whether the surface on which the vehicle is parked is horizontal or inclined in the lengthwise direction of the vehicle, ht e housing having an upper opening through which the feeler element upwardly projects with a substantial portion of the feeler element being above the housing and which permits the feeler element to oscillate in either direction from the neutral, substantially vertical orientation, the sensor assembly further comprising a liquid metal electrical switch integral with the rest of the sensor assembly, liquid metal switch comprising a channel which is downwardly inclined away from the vehicle in the direction of the lengthwise dimension of the vehicle when the sensor assembly is in said neutral orientation, a pair of electrical contact means received in the channel at respective locations spaced from each other in the lengthwise dimension of the channel, and a quantity of liquid metal received in the channel sufficient to contact only one of the electrical contact means when the sensor assembly is in said neutral orientation and sufficient to contact both of said electrical contact means when the feeler element is pushed toward the vehicle by external means sufficiently to substantially decrease the inclination of the channel, and respective electrically conductive wires electrically connected to each of the contact means and adapted to comprise an electrical circuit including alarm means responsive to closing of the liquid metal switch.

2. A device according to claim 1, in which the channel is formed in the body.

* * * * *